United States Patent
Kokot

(10) Patent No.: US 11,280,247 B2
(45) Date of Patent: Mar. 22, 2022

(54) PNEUMATIC SYSTEM AND METHOD FOR HEATING COMPRESSOR OIL AND/OR COMPONENTS OF THE SYSTEM

(71) Applicant: Vanair Manufacturing, Inc., Michigan City, IN (US)

(72) Inventor: Ralph Kokot, Crown Point, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 0 days.

(21) Appl. No.: 16/891,714

(22) Filed: Jun. 3, 2020

(65) Prior Publication Data

US 2021/0033020 A1 Feb. 4, 2021

Related U.S. Application Data

(60) Provisional application No. 62/943,603, filed on Dec. 4, 2019, provisional application No. 62/880,406, filed on Jul. 30, 2019.

(51) Int. Cl.
| | |
|---|---|
| *B01D 17/00* | (2006.01) |
| *F01P 3/20* | (2006.01) |
| *B60K 25/06* | (2006.01) |
| *F02D 29/04* | (2006.01) |
| *F02G 5/00* | (2006.01) |
| *B04C 3/02* | (2006.01) |

(Continued)

(52) U.S. Cl.
CPC ............. *F01P 3/20* (2013.01); *B01D 45/16* (2013.01); *B04C 3/02* (2013.01); *B60K 25/06* (2013.01); *F02B 63/06* (2013.01); *F02D 29/04* (2013.01); *F02G 5/00* (2013.01); *F04D 13/00* (2013.01); *F01P 2060/04* (2013.01); *F01P 2060/18* (2013.01)

(58) Field of Classification Search
CPC .... F04C 29/026; F04C 29/02; F04C 29/0092; F04C 2/00; B01D 45/16; B01D 46/00; B01D 45/12; F01P 1/06; F01P 2060/04; F01P 2060/18; F01P 3/20; B04C 3/02; B60K 25/02; B60K 25/06; F02B 63/06; F02D 29/04; F02G 5/00
USPC ............................................. 55/385.1, 385.3
See application file for complete search history.

(56) References Cited

U.S. PATENT DOCUMENTS

| | | | | |
|---|---|---|---|---|
| 3,785,755 | A | * | 1/1974 | Novak .................. F04C 29/042 418/85 |
| 4,437,813 | A | * | 3/1984 | Ingram ................... F04B 39/06 123/527 |

(Continued)

*Primary Examiner* — George C Jin
*Assistant Examiner* — Teuta B Holbrook
(74) *Attorney, Agent, or Firm* — Hartman Global IP Law; Gary M. Hartman; Domenica N. S. Hartman

(57) ABSTRACT

A pneumatic system installed on a vehicle and method of using the system to preheat compressor oil and/or components of the system to promote operation in cold weather conditions. The pneumatic system includes a compressor that generates compressed air in which oil is entrained, a separation tank that separates the oil from the air prior to the oil being returned to the compressor, and a heating element located within the separation tank and contacting the oil within the separation tank. Engine coolant of an engine cooling system of the vehicle flows through the heating element and the heating element transferring heat from the engine coolant to the oil within the separation tank to increase the temperature of the oil.

24 Claims, 2 Drawing Sheets

(51) Int. Cl.
*B01D 45/16* (2006.01)
*F04D 13/00* (2006.01)
*F02B 63/06* (2006.01)

(56) References Cited

U.S. PATENT DOCUMENTS

| | | | | |
|---|---|---|---|---|
| 4,892,569 A | * | 1/1990 | Kojima | B60T 17/004 |
| | | | | 96/113 |
| 5,056,601 A | * | 10/1991 | Grimmer | F01P 3/20 |
| | | | | 165/47 |
| 5,797,980 A | * | 8/1998 | Fillet | B01D 53/22 |
| | | | | 55/DIG. 17 |
| 6,530,240 B1 | * | 3/2003 | Kountz | F25B 1/047 |
| | | | | 62/611 |
| 6,843,836 B2 | * | 1/2005 | Kitchener | B01D 47/00 |
| | | | | 96/234 |
| 7,052,249 B2 | * | 5/2006 | Virgilio | F04C 29/04 |
| | | | | 184/6.16 |
| 7,588,612 B2 | * | 9/2009 | Marwitz | B01D 53/229 |
| | | | | 55/356 |
| 7,708,793 B2 | * | 5/2010 | Fornof | B01D 45/12 |
| | | | | 55/385.3 |
| 9,964,019 B2 | * | 5/2018 | Gopal | F01P 3/20 |
| 10,746,177 B2 | * | 8/2020 | Collins | F04B 25/04 |
| 2003/0110949 A1 | * | 6/2003 | Fornof | B01D 46/0087 |
| | | | | 96/136 |
| 2009/0056292 A1 | * | 3/2009 | Fornof | B01D 45/12 |
| | | | | 55/385.3 |
| 2016/0186757 A1 | * | 6/2016 | Collins | F04C 18/16 |
| | | | | 418/83 |
| 2017/0016651 A1 | * | 1/2017 | Lee | F25B 25/005 |
| 2017/0101991 A1 | * | 4/2017 | Yenneti | B01D 53/263 |
| 2017/0246568 A1 | * | 8/2017 | Sugio | F04B 39/04 |
| 2018/0017061 A1 | * | 1/2018 | Able | F04C 23/008 |

* cited by examiner

PNEUMATIC SYSTEM AND METHOD FOR HEATING COMPRESSOR OIL AND/OR COMPONENTS OF THE SYSTEM

CROSS-REFERENCE TO RELATED APPLICATIONS

This application claims the benefit of U.S. Provisional Application No. 62/880,406 filed Jul. 30, 2019, and the benefit of U.S. Provisional Application No. 62/943,603 filed Dec. 4, 2019. The contents of these prior patent documents are incorporated herein by reference.

BACKGROUND OF THE INVENTION

The present invention generally relates to pneumatic systems, and in particular to the operation of air compressors of types installed on vehicles, for example, utility, service, municipal, emergency, or military vehicles.

Utility vehicles, service, municipal, emergency, and military vehicles are often equipped with pneumatic systems, and therefore benefit from an onboard air compressor. Such air compressors may be powered by a PTO shaft driven by the engine of the vehicle. The resulting compressed air can be used directly or transmitted to any location around the vehicle and converted back into mechanical energy with a motor to provide a rotary or linear output.

Oil-flooded rotary compressors are a type of onboard air compressor that find use on utility vehicles, service, emergency and military vehicles. Because oil is entrained in the compressed air, a vehicle equipped with this type of compressor requires means for separating the entrained oil from the compressed air. Centrifugal separation techniques performed within vertical separation tanks are well known in the compressor industry. Because vertical tanks impose certain restrictions in terms of where they can be installed, for example, due to their size and/or orientation, horizontal separation tanks of the type disclosed in U.S. Pat. No. 9,233,329 are well suited for use in under-deck compressor applications for vehicles, including a wide variety of utility, service, municipal, emergency, or military vehicles.

Oil-flooded rotary compressors benefit from having some means for warming the compressor oil in cold weather applications. In the past, electric heating pads and electric immersion heaters have been used. However, these devices require electric wiring, circuit breakers and thermostat controls, and the resulting added electrical load to the vehicle electrical system can result in a dead vehicle battery.

BRIEF SUMMARY OF THE INVENTION

The present invention provides a pneumatic system installed on a vehicle and method of using the system to preheat oil of a compressor and/or components of the system to promote operation in cold weather conditions.

According to a nonlimiting aspect of the invention, the pneumatic system is installed on a vehicle having an engine cooling system containing an engine coolant that cools an engine of the vehicle. The pneumatic system includes a compressor that generates compressed air in which oil is entrained, a separation tank that separates the oil from the air prior to the oil being returned to the compressor, and a heating element located within the separation tank and contacting the oil within the separation tank. The engine coolant of the engine cooling system flows through the heating element and the heating element transferring heat from the engine coolant to the oil within the separation tank to increase the temperature of the oil.

Another nonlimiting aspect of the invention is a method of operating a pneumatic system installed on a vehicle to increase a temperature of oil in the pneumatic system. The method entails operating an engine of the vehicle to warm an engine coolant contained in an engine cooling system of the vehicle, delivering a portion of the engine coolant to a heating element located within a separation tank that separates oil from air prior to the oil being returned to a compressor of the pneumatic system, using the heating element to transfer heat from the engine coolant to the oil within the separation tank to increase the temperature of the oil in the separation tank prior to starting the compressor, and then starting the compressor and simultaneously delivering the heated oil to the compressor during start-up of the compressor.

A technical effect of the invention is the ability to preheat the oil of a vehicle-mounted compressor to promote its operation in cold weather conditions without the need for drawing any electrical power as the source of heat.

Other aspects and advantages of this invention will be appreciated from the following detailed description.

DETAILED DESCRIPTION OF THE INVENTION

The present invention is generally applicable to pneumatic systems, and in particular to onboard oil-flooded rotary compressors of types installed on vehicles, for example, utility, service, municipal, emergency, and military vehicles. Such an air compressor may be powered by a PTO (power take-off) shaft driven by the engine of the vehicle. The resulting compressed air can be used directly or transmitted to any location around the vehicle and converted back into mechanical energy with a motor to provide a rotary or linear output.

Figure 1:
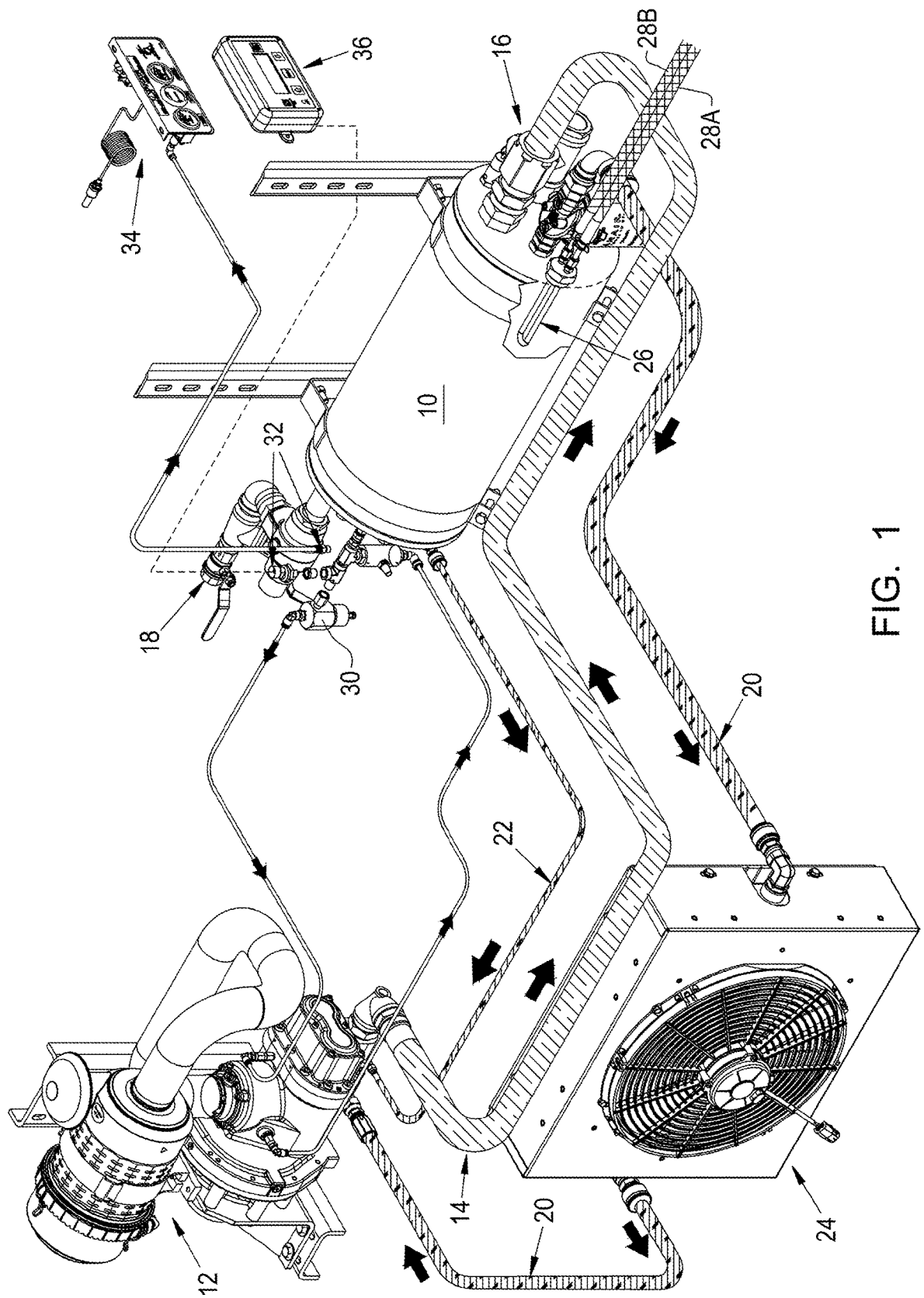
FIG. 1 is a schematic showing components of a pneumatic system configured to preheat the oil of a compressor in accordance with a nonlimiting embodiment of the present invention.
Figure 3:
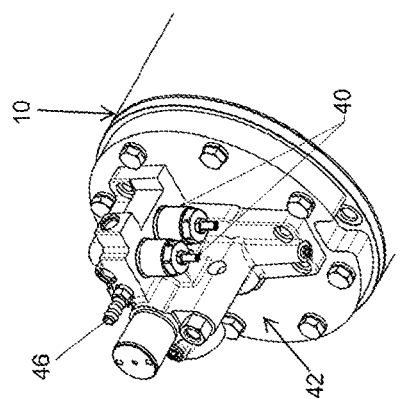
FIG. 3 is a fragmentary perspective view of the gas-liquid separation tank of FIG. 2 taken from a different perspective to show additional details of the manifold.

FIG. 1 represents a gas-liquid separation (air/oil receiver) tank 10 that is capable of separating air and oil of an oil-flooded rotary air compressor 12, also shown in FIG. 1. The separation tank 10 is represented as horizontally oriented, such that the tank 10 is capable of addressing installation issues common with vertical tanks when used in certain applications, for example, under-deck compressor applications for vehicles, including a wide variety of municipal, emergency and military vehicles. A particular but nonlimiting example of such a tank is disclosed in U.S. Pat. No. 9,233,329, whose contents are incorporate herein by reference. The following discussion will refer to the tank 10 depicted in FIG. 1, though it should be understood that the invention is not limited to this tank. For example, it is foreseeable that a vertical tank could be used.

FIG. 1 depicts an air-oil mixture delivered by the compressor 12 to the separation tank 10 via an air/oil line 14 and entering the tank 10 through an air/oil inlet 16, after which the air-oil mixture encounters one or more separation chambers within the tank 10 before exiting the tank 10, preferably as dry air, through an air outlet 18, from which the air may enter a compressed air system (not shown), for example, on a vehicle where it may be used for any suitable purpose. The oil separated from the air is returned to the compressor 12 through an oil line 20 connected to an oil outlet of the tank 10. The pneumatic system represented in FIG. 1 further includes a scavenger line 22 that returns additional oil scavenged from the air within the tank 10 immediately prior to exiting the tank 10. The oil flowing through the oil line 20 may optionally pass through an oil cooler 24 to ensure that the oil returned to the compressor 12 does not exceed a predetermined maximum temperature allowed by the particular compressor design. The compressor 12 may be set up for single pressure or dual pressure operation, in which case FIG. 1 also depicts the system as equipped with a single pressure regulator 30 mounted to the separation tank 10 and fluidically connected to the compressor 12 to control the compressor pressure to match the loads required by air usage. The regulator 30 is shown as in communication through connectors 32 with a mechanical instrument panel 34 and/or a display module 36.

The pneumatic system includes means for heating the oil while resident in the separation tank 10. In the illustrated embodiment, the heating means is a heating element 26 in the form of a U-shaped tube that protrudes into the tank 10. The heating element 26 is preferably fully immersed in the oil (not shown) within the tank 10 and is located within the tank 10 below the tank air/oil inlet 16. Engine coolant is drawn from a cooling system (not shown) of the vehicle through a coolant supply line 28A and delivered to the heating element 26 to warm the oil within the tank 10 prior to the coolant being returned to the vehicle engine via a coolant return line 28B. As such, the heater element 26 is capable of heating the oil within the tank 10 whenever the vehicle engine is running. In typical operation environments, the oil can be prewarmed while the vehicle is being driven to a site where the vehicle and its various operating systems will be used. Though it should be understood that the source of the coolant can be the engine that serves as the primary power plant of the vehicle, other engines or equipment mounted on the vehicle could serve as the source of the coolant.

Temperatures of engine coolants are conventionally controlled by the vehicle thermostats that regulate the coolant temperature to a desired operating temperature, for example, often in a range of about 180 to 195° F. (about 80 to about 90° C.). Because the heating element 26 of FIG. 1 is connected to the vehicle cooling system, the oil can be warmed to a temperature equal to or approaching the engine's coolant temperature prior to the compressor 12 being started. Because the engine will be operating and warmed before the compressor 12 is started, the engine is able to heat the compressor oil before the compressor 12 is started. In a direct engine-driven compressor (portable compressor) this is not possible because the engine and compressor are directly coupled and run at the same time.

As the compressor 12 is operated, the temperature of the oil will continue to be controlled by the engine cooling system of the vehicle (e.g., 180-195° F.), such that once the compressor 12 is operating there is no net heat gain or loss from the heating element 26 or the engine coolant. Because of this regulated coolant temperature, no additional thermostatic device is needed for the pneumatic system represented in FIG. 1, and there is no adverse effect that occurs if the engine coolant is allowed to flow through the heating element 26 in warm or cold ambient temperature conditions. In other words, the heating element 26 can be in continuous operation (i.e., supplied by engine coolant) whenever the engine of the vehicle is running.

Because the heating element 26 warms the compressor oil even when the compressor 12 is not in operation, the heat supplied to the oil is able to inhibit if not prevent any condensed moisture from forming or accumulating in the oil, which is otherwise a common problem with vehicle-mounted air compressors. During the summer months, for example, when preheating of the compressor oil is not necessary for efficient compressor operation, ambient humidity may be relatively high such that the dew point may approach the compressor operating temperature and cause water to condense in the compressor oil. In such a situation, even while the compressor 12 is not operating, the heating element 26 of FIG. 1 continues to warm the compressor oil to prevent condensation and/or purge the compressor oil of the condensed water. This is an advantage, as water in compressor oil is detrimental to the lives of the bearings and oil of an oil-flooded rotary air compressor 12.

Because the heating element 26 does not draw any electrical power (or any other extraneous source) to heat the oil and the operating temperatures of the engine coolant and the compressor oil are virtually the same, there is no risk that the oil will be warmed above an acceptable operating temperature for the oil and compressor 12, unlike electric immersion heaters and pad heaters that draw electrical power directly from an electrical power source and, if left on, can overheat the oil in the tank 10. Additionally, the thermal energy used by the heating element 26 of FIG. 1 is heat that is being rejected from the engine cooling system, whereas conventional electric heaters require electric power or an additional extraneous energy to heat compressor oil. The electric power for an electric heater is often drawn from the engine alternator which takes additional power to operate while the electric heater is operating. A typical electric heater used to warm the oil of an onboard compressor may require 250W of power, or 21 amps of current from the alternator, which can be a significant drain on the vehicle's electrical system.

Depending on whether it is set up for single pressure or dual pressure operation, a compressor system can have one or more regulators to control the compressor pressure to match the loads required by air usage. The regulators have small flow passages and a diaphragm/seat configuration that must freely move within the valve. Moisture present in the air inside the regulator can freeze in cold weather rendering the regulator inoperable. This can cause the compressor to over-pressure and shut down on an over-pressure safety system. Thus, an inoperable regulator means the compressor is inoperable. Keeping the regulators thawed out is a necessity when operating in cold weather. Current practice is to use 12 VDC heating pads to provide a heat source to avoid regulator freeze-up.

Figure 2:
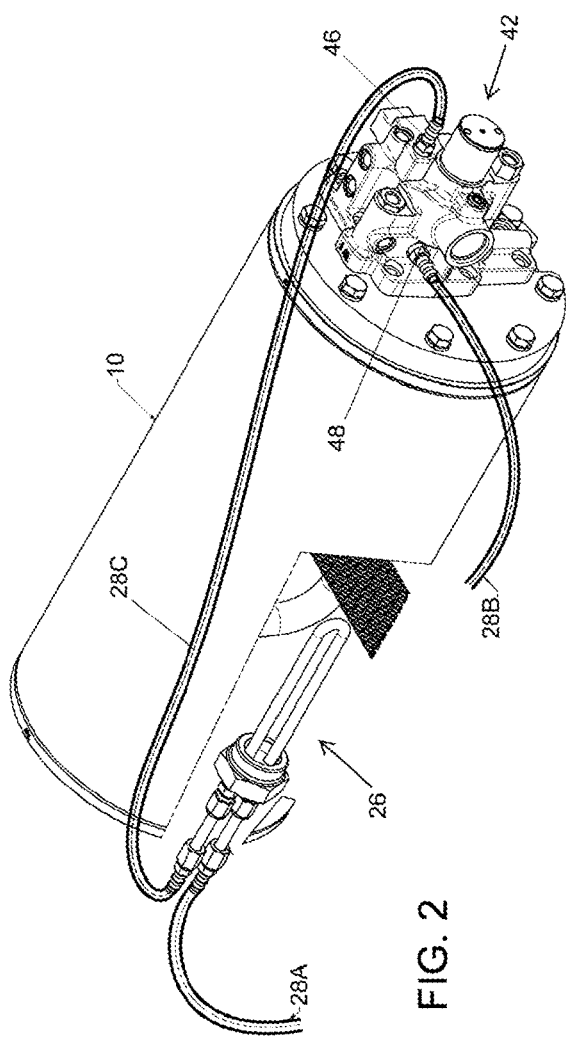
FIG. 2 is a fragmentary perspective view of a gas-liquid separation tank that is equipped with a manifold for preheating the oil of a compressor in accordance with another nonlimiting embodiment of the present invention.
Figure 5:
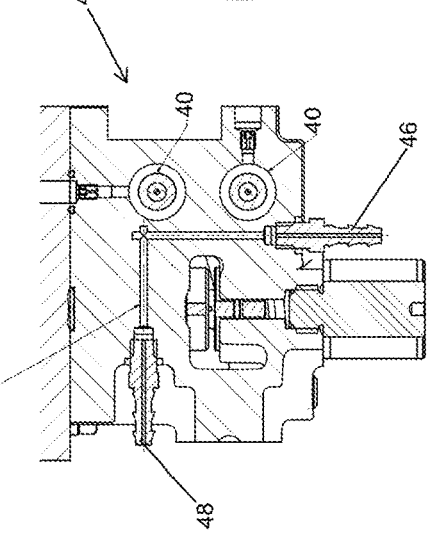
FIG. 5 is a cross-sectional view of the manifold taken along line A-A of FIG. 4.
Figure 4:
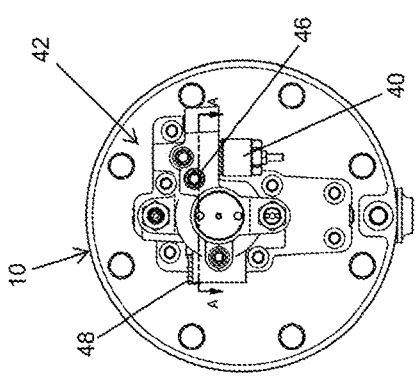
FIG. 4 is an end view of the gas-liquid separation tank of FIGS. 2 and 3.

In FIGS. 2 through 5, the concept of using the vehicle engine coolant to heat the oil in a separation tank 10 as described above is extended to include one or more pressure regulators. In the nonlimiting embodiment of FIGS. 2 through 5, dual pressure regulators 40 are shown to enable a compressor (e.g., compressor 12 in FIG. 1) to be set up for dual pressure operation, and the two pressure regulators 40 are shown as mounted to the separation tank 10 and are intended to be fluidically connected to the compressor to control the compressor pressure to match the loads required by air usage. The regulators 40 are shown in FIG. 2 as housed in a manifold 42 that can be mounted to or an integral part of the separation tank 10. The manifold 42 is shown as having an internal coolant passage 44 disposed adjacent a pair of regulators 40 within the manifold 42. In the nonlimiting embodiment shown, coolant enters the heating element 26 through the coolant supply line 28A, exits the heating element 26 through a hose connection 28C connected to an inlet 46 to the coolant passage 44, and then enters and flows through the coolant passage 44 before exiting the manifold 42 via an outlet 48 and finally the coolant return line 28B that returns the coolant to the vehicle cooling system. As seen in FIG. 5, the inlet 46 is in closer proximity to the regulators 40 than the outlet 48 and coolant entering the manifold 42 through the inlet 46 flows through a segment of the passage 44 immediately alongside the regulators 40 to promote the heating effect in the regulators 40 and the material of the manifold 42 immediately surrounding and contacting the regulators 40 relative to regions of the manifold 42 farther from the regulators 40. The coolant flow connection through the heating element 26 within the separation tank 10 and the coolant passage 44 within the manifold 42 can be in series as shown, but may alternatively be connected in parallel. Series connection insures full flow of the heated engine coolant through both the heating element 26 and manifold 42.

By using engine coolant regulated to the temperature of an engine cooling system (e.g., 180-195° F.), the advantages of heating the compressor oil within the separation tank 10 extend to heating the regulators 40 of the compressor system. The manifold 42 encompassing one or more regulators 40 and one or more coolant passages 44 serves to heat the regulators 40 and thaw out any frozen moisture which may accumulate in the internal workings of a regulator 40, for example, their seat, diaphragm and flow passages. By incorporating the engine coolant passage 44 to heat the regulators 40, electric heater pads are no longer required, along with the associated wiring, controls and electric power needed to operate them.

While the invention has been described in terms of a particular embodiment, it is apparent that other forms could be adopted by one skilled in the art. For example, the type or configuration of the pneumatic system, separation tank 10, compressor 12, and heating element 26 could differ from that shown, different operating parameters could be employed, the coolant could be drawn from a source other than the engine of the vehicle on which the system is installed, and various materials and processes could be used to produce the components of the pneumatic system. As such, it should be understood that the above detailed description is intended to describe the particular embodiment and certain but not necessarily all features and aspects thereof, and to identify certain but not necessarily all alternatives to the embodiment and its described features and aspects. Accordingly, it should be understood that the invention is not necessarily limited to the embodiment described herein, and the phraseology and terminology employed above are for the purpose of describing the disclosed embodiment and do not necessarily serve as limitations to the scope of the invention. Therefore, the scope of the invention is to be limited only by the following claims.

The invention claimed is:

1. A pneumatic system installed on a vehicle having an engine cooling system containing an engine coolant that cools an engine of the vehicle, the pneumatic system comprising:
    a compressor that generates compressed air in which oil is entrained;
    a separation tank that separates the oil from the air prior to the oil being returned to the compressor; and
    a heating element located within the separation tank and contacting the oil within the separation tank, the engine coolant flowing through the heating element and the heating element transferring heat from the engine coolant to the oil within the separation tank to increase the temperature of the oil.

2. The pneumatic system of claim 1, wherein the temperature of the oil is controlled by the engine cooling system of the vehicle.

3. The pneumatic system of claim 1, further comprising an oil cooler that cools the oil exiting the separation tank before the oil is returned to the compressor.

4. The pneumatic system of claim 1, wherein the compressor is an oil-flooded rotary compressor.

5. The pneumatic system of claim 1, wherein the compressor is driven by a power take-off unit installed on the vehicle.

6. The pneumatic system of claim 1, wherein the engine is the primary power plant of the vehicle.

7. The pneumatic system of claim 1, wherein the engine is not the primary power plant of the vehicle.

8. The pneumatic system of claim 1, the system further comprising a manifold comprising an internal coolant passage and at least a first regulator of the pneumatic system that is mounted to the manifold in proximity to the internal coolant passage, the engine coolant flowing through the internal coolant passage to transfer heat from the engine coolant to the first regulator.

9. The pneumatic system of claim 8, wherein the internal coolant passage is fluidically connected to the heating element so that the engine coolant flows through the heating element and the internal coolant passage in series.

10. The pneumatic system of claim 1, wherein the vehicle is chosen from the group consisting of utility vehicles, service vehicles, municipal vehicles, emergency vehicles, and military vehicles.

11. A method of operating the pneumatic system of claim 1 to increase the temperature of the oil, the method comprising:
    operating the engine to warm the engine coolant;
    delivering a portion of the engine coolant to the heating element;
    using the heating element to transfer heat from the engine coolant to the oil within the separation tank to increase the temperature of the oil in the separation tank in preparation for start-up of the compressor; and then
    starting the compressor and simultaneously delivering the heated oil from the separation tank to the compressor during start-up of the compressor.

12. The method of claim 11, wherein the temperature of the oil is regulated to be approximately equal to the temperature of the engine coolant.

13. The method of claim 11, wherein the temperature of the engine coolant is 80 to 90° C.

14. The method of claim 11, wherein the heating element does not use any electrical power as the source of heat.

15. The method of claim 11, further comprising cooling the heated oil before delivering the heated oil from the separation tank to the compressor so that the heated oil does not exceed a predetermined maximum temperature of the compressor.

16. The method of claim 11, further comprising flowing the engine coolant through an internal coolant passage within a manifold and in proximity to at least a first regulator of the pneumatic system that is mounted to the manifold to transfer heat from the engine coolant to the first regulator.

17. The method of claim 16, wherein the internal coolant passage is fluidically connected to the heating element so that the engine coolant flows through the heating element and the internal coolant passage in series.

18. A method of operating a pneumatic system installed on a vehicle to increase a temperature of oil in the pneumatic system, the method comprising:
   operating an engine of the vehicle to warm an engine coolant contained in an engine cooling system of the vehicle;
   delivering a portion of the engine coolant to a heating element located within a separation tank of the pneumatic system that separates oil from air prior to the oil being returned to a compressor of the pneumatic system;
   using the heating element to transfer heat from the engine coolant to the oil within the separation tank to increase the temperature of the oil in the separation tank prior to starting the compressor; and then
   starting the compressor and simultaneously delivering the heated oil from the separation tank to the compressor during start-up of the compressor.

19. The method of claim 18, wherein the temperature of the oil is regulated to be approximately equal to the temperature of the engine coolant.

20. The method of claim 18, wherein the temperature of the engine coolant is 80 to 90° C.

21. The method of claim 18, wherein the heating element does not use any electrical power as the source of heat.

22. The method of claim 18, further comprising cooling the heated oil before delivering the heated oil from the separation tank to the compressor so that the heated oil does not exceed a predetermined maximum temperature of the compressor.

23. The method of claim 18, further comprising flowing the engine coolant through an internal coolant passage within a manifold and in proximity to at least a first regulator of the pneumatic system that is mounted to the manifold to transfer heat from the engine coolant to the first regulator.

24. The method of claim 23, wherein the internal coolant passage is fluidically connected to the heating element so that the engine coolant flows through the heating element and the internal coolant passage in series.

\* \* \* \* \*